US011939502B2

(12) United States Patent
Hens et al.

(10) Patent No.: US 11,939,502 B2
(45) Date of Patent: *Mar. 26, 2024

(54) QUANTUM DOTS WITH A III-V CORE AND AN ALLOYED II-VI EXTERNAL SHELL

(71) Applicant: QustomDot B.V., Ghent-Zwijnaarde (BE)

(72) Inventors: Zeger Hens, Ghent (BE); Mickael Tessier, Ghent (BE); Dorian Dupont, Ghent (BE)

(73) Assignee: QustomDot B.V., Ghent-Zwijnaarde (BE)

( * ) Notice: Subject to any disclaimer, the term of this patent is extended or adjusted under 35 U.S.C. 154(b) by 0 days.

This patent is subject to a terminal disclaimer.

(21) Appl. No.: 17/542,532

(22) Filed: Dec. 6, 2021

(65) Prior Publication Data

US 2022/0089944 A1 Mar. 24, 2022

Related U.S. Application Data

(63) Continuation of application No. 16/473,157, filed as application No. PCT/EP2017/083599 on Dec. 19, 2017, now Pat. No. 11,220,630.

(30) Foreign Application Priority Data

Dec. 23, 2016 (EP) .................................. 16206877

(51) Int. Cl.
*C09K 11/62* (2006.01)
*B82Y 20/00* (2011.01)
(Continued)

(52) U.S. Cl.
CPC ............ *C09K 11/623* (2013.01); *C09K 11/02* (2013.01); *C09K 11/70* (2013.01);
(Continued)

(58) Field of Classification Search
CPC ... B82Y 20/00; C09K 11/883; C09K 11/7492; C09K 11/70
See application file for complete search history.

(56) References Cited

U.S. PATENT DOCUMENTS

| 7,264,527 B2 | 9/2007 | Bawendi et al. |
| 7,964,278 B2 | 6/2011 | Banin et al. |

(Continued)

FOREIGN PATENT DOCUMENTS

| JP | 2011252117 A | 12/2011 |
| JP | 2013539798 A | 10/2013 |

(Continued)

*Primary Examiner* — C Melissa Koslow
(74) *Attorney, Agent, or Firm* — N.V. Nederlandsch Octrooibureau

(57) ABSTRACT

The present disclosure relates to quantum dots with a core of III-V material, a first layer of II-VI material and an external shell of II-VI material to be used, for example, in down-converters. The external shell is preferably made of an alloy of Zn and Cd with Se or S. Introducing a small amount of Cd in the external shell provides excellent absorbance performance in blue, violet and UV wavelengths. The amount of Cd needed for this increase in absorbance can be very low. Further, the emitted light can be nearly monochromatic, which is especially interesting in electronic applications.

13 Claims, 8 Drawing Sheets

(51) Int. Cl.
*C09K 11/02* (2006.01)
*C09K 11/70* (2006.01)
*C09K 11/74* (2006.01)
*C09K 11/88* (2006.01)
*F21V 9/30* (2018.01)

(52) U.S. Cl.
CPC ........ *C09K 11/7492* (2013.01); *C09K 11/883* (2013.01); *F21V 9/30* (2018.02); *B82Y 20/00* (2013.01)

(56) References Cited

U.S. PATENT DOCUMENTS 11,220,630 B2 * 1/2022 Hens ...................... C09K 11/02
2017/0130127 A1 * 5/2017 Kamplain ......... H01L 21/02546

FOREIGN PATENT DOCUMENTS

| WO | 2016189531 A1 | 12/2016 |
| WO | WO 2016/189531 * | 12/2016 |
| WO | 2018078147 A1 | 5/2018 |

* cited by examiner

QUANTUM DOTS WITH A III-V CORE AND AN ALLOYED II-VI EXTERNAL SHELL

TECHNICAL FIELD

According to a first aspect, the present disclosure relates to a quantum dot. According to a second aspect, the present disclosure relates to a process for producing a quantum dot.

BACKGROUND OF THE INVENTION

Quantum dots are an enabling material for applications relying on luminescent downconversion, i.e., conversion of light with a higher frequency to light with a lower frequency.

Quantum dots comprising a core of CdSe and a shell of CdS have already been used for downconversion. A major drawback of such quantum dots is that Cd is a toxic heavy metal with restricted use in several countries.

Quantum dots comprising a core of InP and a shell of ZnS or ZnSe have also already been used for downconversion. A problem of these quantum dots is that their absorbance in violet and blue, especially around 450 nm, is low, while this range of wavelength is especially important for optical pumping in display or lighting applications.

Document US2013/273247 A1 discloses quantum dots having a core of InAs, a first layer of CdSe and an external shell of CdZnS.

Document WO2013/058900 A1 discloses quantum dots having a core of InP, a first layer of ZnSeS and an external shell of ZnSeS.

Document US2013/148057 A1 discloses quantum dots having a core of InP, a first layer of ZnSeS and an external shell of ZnS.

Document US2013/115455 A1 discloses quantum dots having a core of InP, a first layer of ZnSe and an external shell of CdS.

SUMMARY OF THE INVENTION

According to a first aspect, an object of the disclosure is to provide a quantum dot with high absorbance of blue light and high photoluminescence quantum yield.

According to this first aspect, the disclosure provides a quantum dot comprising:
a core of a binary, ternary or quaternary III-V material consisting in:
at least one element selected from the group consisting of In, Ga and Al, and
at least one element selected from the group consisting of P and As;
a first layer of a binary or ternary II-VI material consisting in:
Zn, and
at least one element selected from the group consisting of S and Se; and
an external shell of a ternary or quaternary II-VI material consisting in:
Zn,
Cd, and
at least one element selected from the group consisting of S and Se.

The inventors have demonstrated that introducing a small amount of Cd in the external shell strongly increases the absorbance of the quantum dots in blue, violet and UV wavelengths. The amount of Cd needed for this increase in absorbance can be kept relatively low. It can for example be kept low enough to fulfill a legal restriction limit for the material that contains the quantum dots, which can be of 0.01% of Cd in concentration. The wavelength of the emitted light can be chosen by selecting the dimension of the quantum dots and the composition of the external shell. The inventors have shown that the emitted light can be nearly monochromatic, which is especially interesting in optoelectronic applications. It is for example possible, using the quantum dots according to the disclosure, to convert part of a blue LED backlight into green or red lights such as to obtain an overall white color spectrum.

The obtained internal photoluminescent quantum yield is relatively high: it can be around 45%. Moreover, the inventors have shown that a material containing the quantum dots according to the disclosure can have a low self-absorption. This indicates that the high internal photoluminescent quantum yield translates into a high external photoluminescent quantum yield.

The low self-absorption has another advantage: a low amount of quantum dots is sufficient to obtain a high downconversion.

The external shell can be considered as a second layer of the quantum dot.

In an embodiment of the disclosure, the proportion between Zn and Cd in the external shell is such that the conduction band of the external shell is at a higher energy than the conduction band of the core. In other words, there is a straddling band alignment (type 1) between the external shell and the core. Such a configuration of the energy bands is more favorable than a staggered band alignment (type 2) wherein the emission wavelength would become too long or the emission peak too broad or the photoluminescent quantum yield too low in, for example, display applications.

In an embodiment of the disclosure, the ratio between the number of atoms of Cd and sum of the number of atoms of Zn and the number of atoms of Cd is between 0.001 and 1.0, preferably between 0.02 and 0.2, more preferably between 0.025 and 0.133.

These compositions can be determined by EDX (Energy-dispersive X-ray spectroscopy) measurement on an ensemble of quantum dots. The upper limit of 0.2 for the ratio between the number of atoms of Cd and sum of the number of atoms of Zn and the number of atoms of Cd is especially interesting because it corresponds to a bulk band gap of 508 nm.

In an embodiment of the disclosure, the external shell is made of an alloy of Zn, Cd and Se indicated by the notation "(Cd,Zn)Se".

In an embodiment of the disclosure, the core is made of InP and the first layer is made of ZnSe.

Preferably, in the quantum dot, the ratio between the number of atoms of Se and the number of atoms of Zn is between 0.5 and 1.5, more preferably between 0.9 and 1.1, even more preferably around 1. This ratio can be determined by EDX (Energy-dispersive X-ray spectroscopy) on a ensemble of quantum dots.

In an embodiment of the disclosure, the core is made of InP and the first layer is made of ZnS.

Preferably, in the quantum dot, the ratio between the number of atoms of S and the number of atoms of Zn is between 0.5 and 1.5, more preferably between 0.9 and 1.1, even more preferably around 1. This ratio can be determined by EDX (Energy-dispersive X-ray spectroscopy) on an ensemble of quantum dots.

In an embodiment of the disclosure, the first layer has a thickness up to 0.8 nm, preferably comprised between 0.2 and 0.8 nm.

The first layer prevents the growth of CdSe on the InP core. To get this effect and have good optical properties for downconversion, the optimal thickness of the first layer is in this range. The external shell has preferably a thickness comprised between 1 and 10 nm. The ratio between the volume of the external shell and the volume of the core is preferably between 10 and 50, more preferably around 20.

In an embodiment of the disclosure, the quantum dot comprises a ligand shell comprising thiol molecules.

Preferably, the ligand layer surrounds the external shell.

The inventors have shown that a ligand layer comprising thiol molecules provides photostability for the quantum dots in solution as well as in solid layers. This photostability gives a long lifetime for devices including the quantum dots according to the disclosure.

In an embodiment of the disclosure, the quantum dots have an average diameter between 5 and 30 nm, preferably between 10 and 20 nm, more preferably between 14 and 15 nm or between 13 and 14 nm.

Quantum dots having an average diameter in this range can provide good optical properties for downconversion because the absorption coefficient at wavelengths corresponding to the pump light strongly exceeds the absorption coefficient at wavelengths corresponding to the quantum dot emission. If the volume of the shell is increased, and thus the volume of the quantum dots, the absorption per quantum dot increases too.

The disclosure also relates to a polymer film comprising quantum dots according to any embodiment of the disclosure.

The inventors have shown that the quantum dots according to the disclosure keep their advantageous properties when embedded in a polymer film, which is a solid layer.

The disclosure also relates to a luminescent downconverter for converting down light frequency. The luminescent downconverter comprises quantum dots according to any embodiment of the disclosure or a polymer film according to any embodiment of the disclosure.

In the frame of the present document, a luminescent downconverter is a device able to convert light with a higher frequency to light with a lower frequency. The properties of the quantum dots according to the disclosure are especially advantageous for downconversion.

According to a second aspect, the disclosure provides a process for producing a quantum dot comprising the chronological steps of:
(a) producing a core nanocrystal of a binary, ternary or quaternary III-V material consisting in:
at least one element selected from the group consisting of In, Ga and Al, and
at least one element selected from the group consisting of P and As;
(b) forming a first layer on the core nanocrystal, the first layer being of a binary or ternary II-VI material consisting in:
Zn, and
at least one element selected from the group consisting of S and Se; and
(c) forming an external shell on the first layer, the external shell being of a ternary or quaternary II-VI material consisting in:
Zn,
Cd, and
at least one element selected from the group consisting of S and Se.

The process is preferably applied to a plurality of quantum dots together. The core nanocrystal created at step (a) forms the core of the quantum dot.

Step (a) can be performed by any known method or by one of the exemplary methods disclosed in the present document.

Steps (a) and (b) can be performed by a known method that produces a quantum dot with a core of InP and a shell with one of the described compositions.

The disclosure provides a process for producing a downconverter including the process for producing quantum dots according to an embodiment of the disclosure.

In an embodiment of the disclosure, step (a) is producing an InP core nanocrystals and step (b) is forming a first layer of ZnSe or ZnS around the InP core nanocrystals.

In an embodiment of the disclosure, step (a) comprises mixing a compound including Zn with a compound including In and a compound including P to generate a first mixture and step (b) comprises mixing said first mixture with a compound including Se or S to generate a second mixture. If said compound includes Se, it will provide a first layer of ZnSe. If said compound includes S, it will provide a first layer of ZnS.

The first mixture comprises InP core nanocrystals. Preferably, no Cd is added at step (b).

In an embodiment of the disclosure, the external shell is made of an alloy of Zn, Cd and Se indicated by the notation "(Cd,Zn)Se" and step (c) comprises adding a compound including Cd, a compound including Zn and a compound including Se to a solution produced at step (b).

In an embodiment of the disclosure, step (c) comprises, in this order:
adding a compound including Cd and a compound including Zn to a solution produced at step (b) with an atomic ratio between the added Cd and the added Cd plus the added Zn between 0.001 and 1.0, preferably between 0.02 and 0.2, more preferably between 0.025 and 0.133, and
adding a compound including Se.

In an embodiment of the disclosure, the process further comprises a step (d) of adding a thiol compound to a solution resulting from step (c).

In other words, the disclosure is able to provide shell-enhanced absorption of photostable InP-based quantum dots for luminescent downconversion.

In an embodiment of the disclosure, the quantum dot comprises:
a core of a binary, ternary or quaternary III-V material consisting in one or several group III elements selected from the group consisting of In, Ga and Al and one or several group V elements selected from the group consisting of P and As,
a first layer of a binary or ternary II-VI material consisting in a group II element which is Zn and one or several group VI elements selected from the group consisting of S and Se, and
an external shell of a ternary or quaternary II-VI material consisting in one or several group II elements selected from the group consisting of Zn and Cd and one or several group VI elements selected from the group consisting of S and Se.

In an embodiment of the disclosure, for producing quantum dots comprises the steps of:
(a) producing a core nanocrystal of a binary, ternary or quaternary III-V material consisting in one or several group III elements selected from the group consisting of In, Ga and Al and one or several group V elements selected from the group consisting of P and As, (b) forming a first layer on the core nanocrystal, the first layer being of a binary or ternary II-VI material consisting in a group II element which is Zn and one or several group VI elements selected from the group consisting of S and Se, and (c) forming an external shell on the first layer, the external shell being of a ternary or quaternary II-VI material consisting in one or several group II elements selected from the group consisting of Zn and Cd and one or several group VI elements selected from the group consisting of S and Se.

BRIEF DESCRIPTION OF THE FIGURES

For a better understanding of the present disclosure, reference will now be made, by way of example, to the accompanying drawings in which.

DETAILED DESCRIPTION

Figure 1:
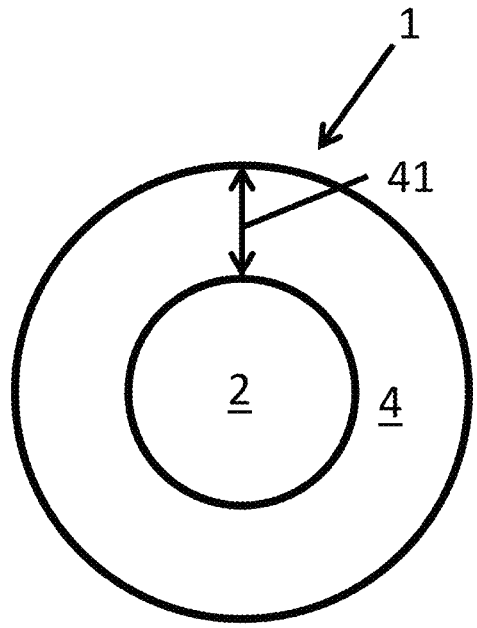
FIG. 1 schematizes a quantum dot according to a first embodiment of the disclosure, FIG. 2 schematizes a quantum dot according to a second embodiment of the disclosure.

The present disclosure will be described with respect to particular embodiments and with reference to certain drawings but the disclosure is not limited thereto. The drawings described are only schematic and are non-limiting. In the drawings, the size of some of the elements may be exaggerated and not drawn on scale for illustrative purposes.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Furthermore, the various embodiments, although referred to as "preferred" are to be construed as exemplary manners in which the disclosure may be implemented rather than as limiting the scope of the disclosure.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present disclosure, the only enumerated components of the device are A and B, and further the claim should be interpreted as including equivalents of those components.

On the figures, identical or analogous elements may be referred by a same number.

In the frame of the present document, the "internal photoluminescent quantum yield" (internal PLQY or IQE) is the ratio between the number of photons emitted and absorbed by the quantum dots.

In the frame of the present document, the "external photoluminescent quantum yield" (external PLQY or EQE) is the ratio between the number of photons that can be externally collected and the number of photons absorbed by the quantum dots.

In the frame of the present document, a "III-V material", which can also be called III-V compound, is a material consisting in element(s) of the group III of the periodic table and in element(s) of the group V of the periodic table. The elements of the III-V material are mixed within the material, preferably in such a way that the III-V material is homogeneous.

In the frame of the present document, a "II-VI material", which can also be called 11-VI compound, is a material consisting in element(s) of the group II of the periodic table and in element(s) of the group VI of the periodic table. The elements of the II-VI material are mixed within the material, preferably in such a way that the II-VI material is homogeneous.

In the frame of the present document, a "binary material", which can also be called binary compound, is a material consisting in two different elements.

In the frame of the present document, a "ternary material", which can also be called ternary compound, is a material consisting in three different elements.

In the frame of the present document, a "quaternary material", which can also be called quaternary compound, is a material consisting in four different elements.

FIG. 1 schematizes a quantum dot 1 according to a first embodiment of the disclosure. The quantum dot 1 comprises a core 2 of a binary, ternary or quaternary III-V material and an external shell 4 of a ternary or quaternary II-VI material.

The III-V material of the core 2 consists in at least one group III element and in at least one group V element. More specifically, the III-V material of the core 2 consists in In, Ga, Al or a mixture thereof and in P, As or a mixture thereof.

The II-VI material of the external shell 4 consists in at least one group II element and in at least one group VI element. More specifically, the II-VI material of the external shell 4 consists in Zn, Cd or a mixture thereof and in S, Se or a mixture thereof. Preferably, the II-VI material of the external shell 4 consists in a mixture of Zn and Cd, and in S, Se or a mixture thereof.

Preferably, the core 2 is made of InP and the external shell 4 is made of ZnCdSe, which can be noted (Cd,Zn)Se. It is an alloy of Cd, Zn and Se. The quantum dot 1 may comprise an intermediate layer between the core 2 and the external shell 4.

It is also possible that the quantum dot 1 comprises a first layer 3 made of ZnS, ZnSe or of an alloy of Zn, S and Se. The alloy of Zn, S and Se can be written Zn(S, Se).

Figure 2:
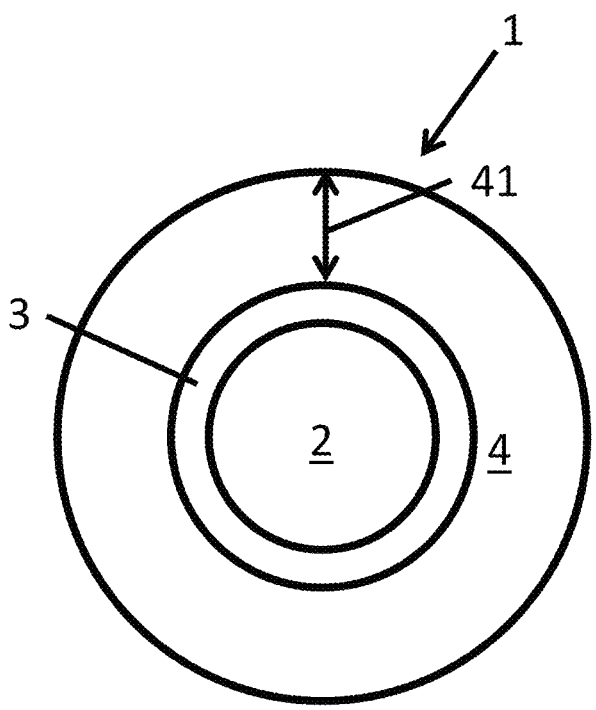

FIG. 2 schematizes a quantum dot 1 according to a second embodiment of the disclosure. The quantum dot 1 comprises a core 2 of a binary, ternary or quaternary III-V material, a first layer 3 of a binary or ternary II-VI material and an external shell 4 of a ternary or quaternary II-VI material.

The III-V material of the core 2 consists in at least one group III element and in at least one group V element. More specifically, the III-V material of the core 2 consists in In, Ga, Al or a mixture thereof and in P, As or a mixture thereof.

The II-VI material of the first layer 3 consists in at least one group II element and in at least one group VI element. More specifically, the II-VI material of the first layer 3 consists in Zn and in S, Se or a mixture of S and Se.

The II-VI material of the external shell 4 consists in at least one group II element and at least one group VI element. More specifically, the II-VI material of the external shell 4 consists in Zn, Cd or a mixture thereof and in S, Se or a mixture thereof. Preferably, the II-VI material of the external shell 4 consists in a mixture of Zn and Cd, and in S, Se or a mixture thereof.

Preferably, the core 2 is made of InP, the first layer 3 is made of ZnSe or ZnS and the external shell 4 is made of ZnCdSe. The first layer 3 has preferably a thickness up to 0.8 nm, more preferably comprised between 0.2 and 0.8 nm.

The difference between the quantum dot 1 in the first and the second embodiments of the disclosure is the presence of the first layer 3 of ZnSe or ZnS. The first layer 3 is beneficial during the production of the quantum dot, but is not expected to have a significant effect on the optical properties of the quantum dot because it creates a barrier sufficiently thin to obtain a fast transfer by tunneling of charge carriers between the external shell 4 and the core 2.

In the present document, the quantum dots 1 may be quantum dots according to the first embodiment of the disclosure, to the second embodiment of the disclosure or a mix of both. Even if the experimental data presented in the present document relate to quantum dots 1 according to the second embodiment of the disclosure, the inventors expect that similar data can be obtained with quantum dots according to the first embodiment of the disclosure because the first layer 3 is thin enough to hardly modify the tunneling between the external shell 4 and the core 2.

In the present document, the notation "InP/Cd$_x$Zn$_{1-x}$Se" indicates a quantum dot with a core 1 made of InP and an external shell 4 made of an alloy of Zn, Cd and Se, with a ratio between the number of atoms of Cd in the quantum dot 1 and the total number of atoms of Zn and Cd in the quantum dot 1 equal to X. X is preferably determined by EDX measurements on a whole quantum dot 1. The notation InP/Cd$_x$Zn$_{1-x}$Se covers quantum dots 1 according to the first embodiment of the disclosure and quantum dots 1 according to the second embodiment of the disclosure.

The core 2, the first layer 3 and the external shell 4 are solid layers.

The quantum dots 1 according to the disclosure are preferably synthetized as colloidal quantum dots.

In an embodiment of the disclosure, the quantum dots have an average diameter between 5 and 30 nm, preferably between 10 and 20 nm, more preferably between 14 and 15 nm or between 13 and 14 nm. The external shell 4 has preferably a thickness 41 comprised between 1 and 10 nm.

Figure 3A:
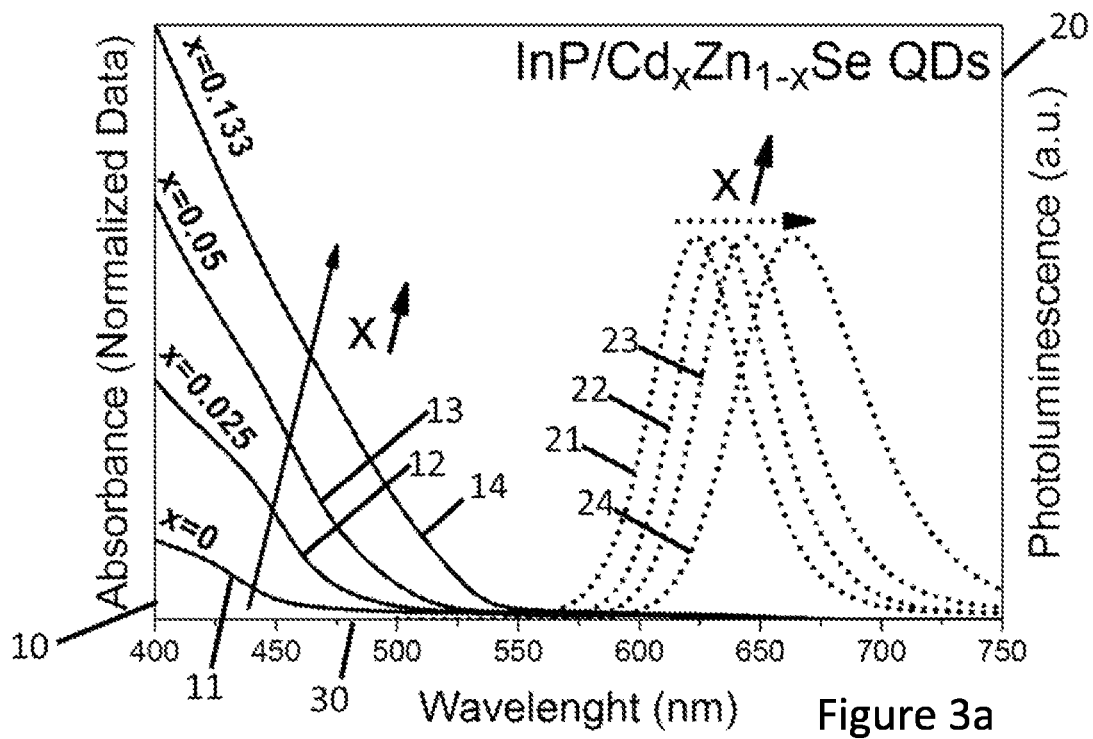
FIG. 3a is an experimental plot of the absorbance normalized at the first exciton peak of the InP core in the core/shell structure and the photoluminescence for quantum dots according to an embodiment of the disclosure and for quantum dots without Cd, as function of the wavelength.

FIG. 3a is an experimental plot of the absorbance 10 (full lines) and the photoluminescence 20 (dotted lines) for quantum dots 1 according to an embodiment of the disclosure and quantum dots without Cd, as function of the wavelength 30. The absorbance is normalized at the first exciton peak of the InP core in the core/shell structure.

The absorbance curve with X=0 is referenced as 11. The absorbance curve with X=0.025 is referenced as 12. The absorbance curve with X=0.05 is referenced as 13. The absorbance curve with X=0.133 is referenced as 14. It clearly appears that the absorbance in violet and blue strongly increases as compared to the absorbance in the red with increasing X, i.e., with the amount of Cd in the external shell 4.

The photoluminescence curve with X=0 is referenced as 21. The photoluminescence curve with X=0.025 is referenced as 22. The photoluminescence curve with X=0.05 is referenced as 23. The photoluminescence curve with X=0.133 is referenced as 24. It clearly appears that the violet/blue photon absorption gives rise to emission in green, yellow, orange and red. The emission wavelength is actually tunable by varying the size and/or shape of the quantum dots 1 (see FIG. 3b).

Figure 3B:
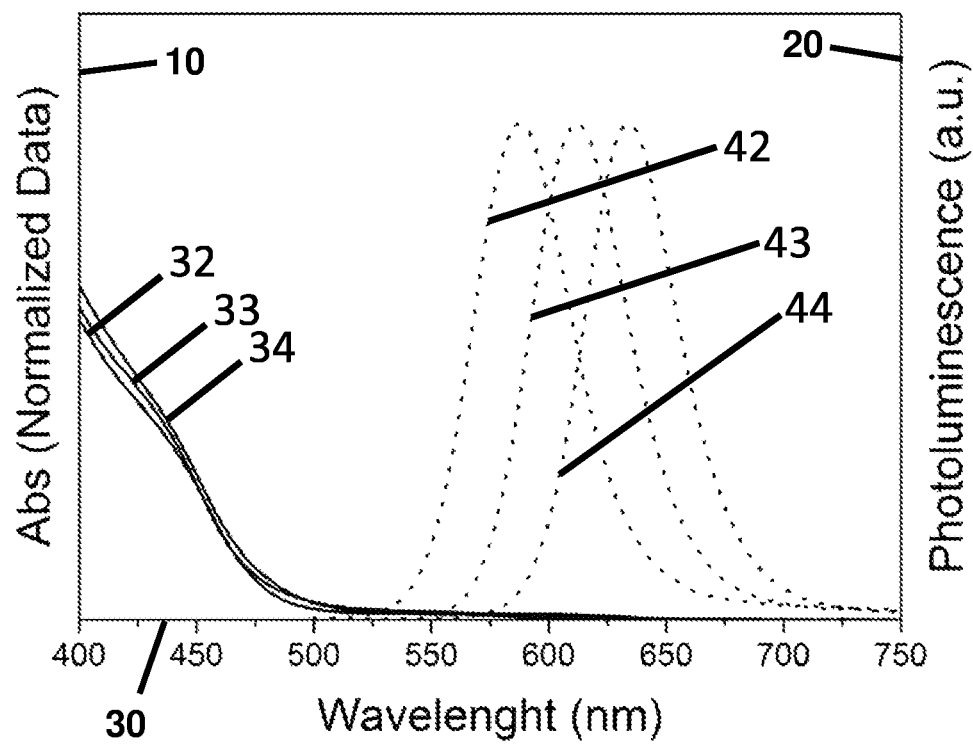
FIG. 3b is an experimental plot of the absorbance normalized at the first exciton peak of the InP core in the core/shell structure and the photoluminescence for quantum dots according to an embodiment of the disclosure for various InP core sizes, as function of the wavelength.

FIG. 3b is an experimental plot of the absorbance 10 (full lines) and the photoluminescence 20 (dotted lines) for quantum dots 1 according to an embodiment of the disclosure as function of the wavelength 30. X is equal to 0.025 for all curves and the diameter of the core 2 is varied. The absorbance is normalized at the first exciton peak of the InP core in the core/shell structure.

The absorbance curve with a core diameter equal to 2.8 nm is referenced as 32. The absorbance curve with a core diameter equal to 3 nm is referenced as 33. The absorbance curve with a core diameter equal to 3.2 nm is referenced as 34. It appears that the absorbance curve hardly depends on the core size.

The photoluminescence curve with a core diameter equal to 2.8 nm is referenced as 42. The photoluminescence curve with a core diameter equal to 3 nm is referenced as 43. The photoluminescence curve with a core diameter equal to 3.2 nm is referenced as 44. The photoluminescence shows a shift towards the higher wavelength with an increase in the core size.

Figure 4:
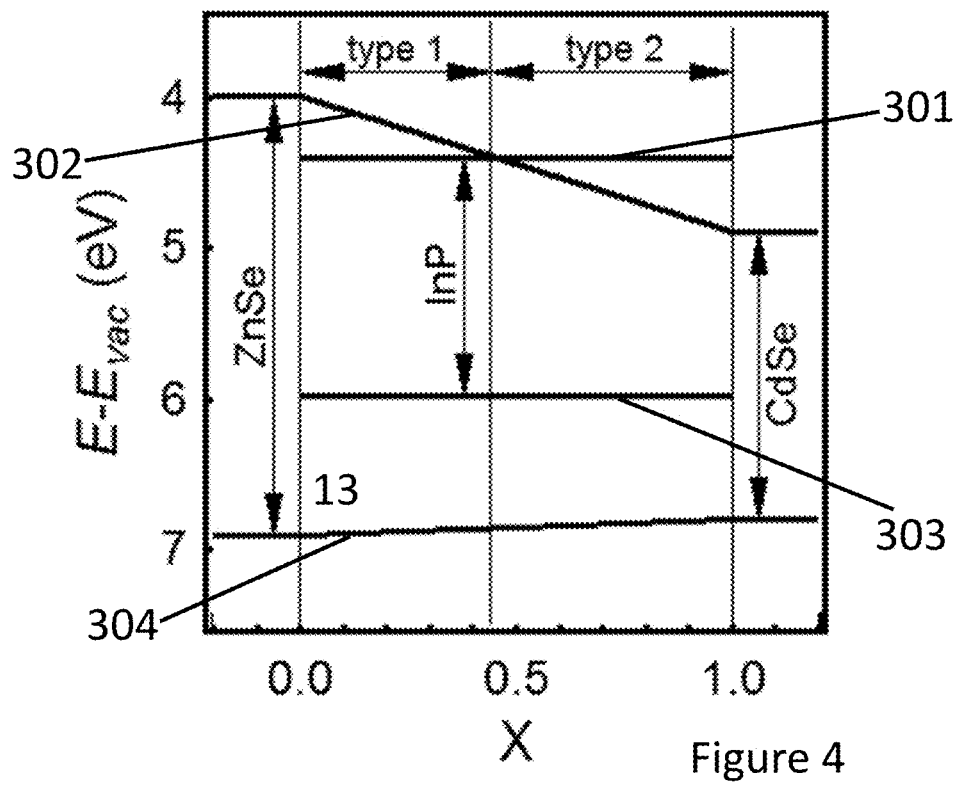
FIG. 4 is a schematic representation of the energy band and band alignment of bulk InP, ZnSe and CdSe materials.

The progressive redshift of the emission wavelength with the increasing Cd content in the external shell 4, visible at FIG. 3a, might be due to the reduction of the core/shell conduction band offset as illustrated at FIG. 4. It is therefore expected that the absorption and emission are dependent on the thickness 41 of the external shell 4, the Cd content in the external shell 4 and the size of the core 2. It is thus possible to choose to tune one or several of these parameters in order to achieve a precise emission wavelength while using as low cadmium as possible in order to, for example, respect the Restriction of Hazardous Substances Directive.

FIG. 4 also shows that there is a straddling gap (type 1) between the external shell 4 of ZnCdSe and the core 2 of InP because the conduction band 301 of InP is at a lower energy than the conduction band 302 of the external shell 4 of ZnCdSe and the valence band 303 of InP is at a higher energy than the valence band 304 of InP.

Figure 5:
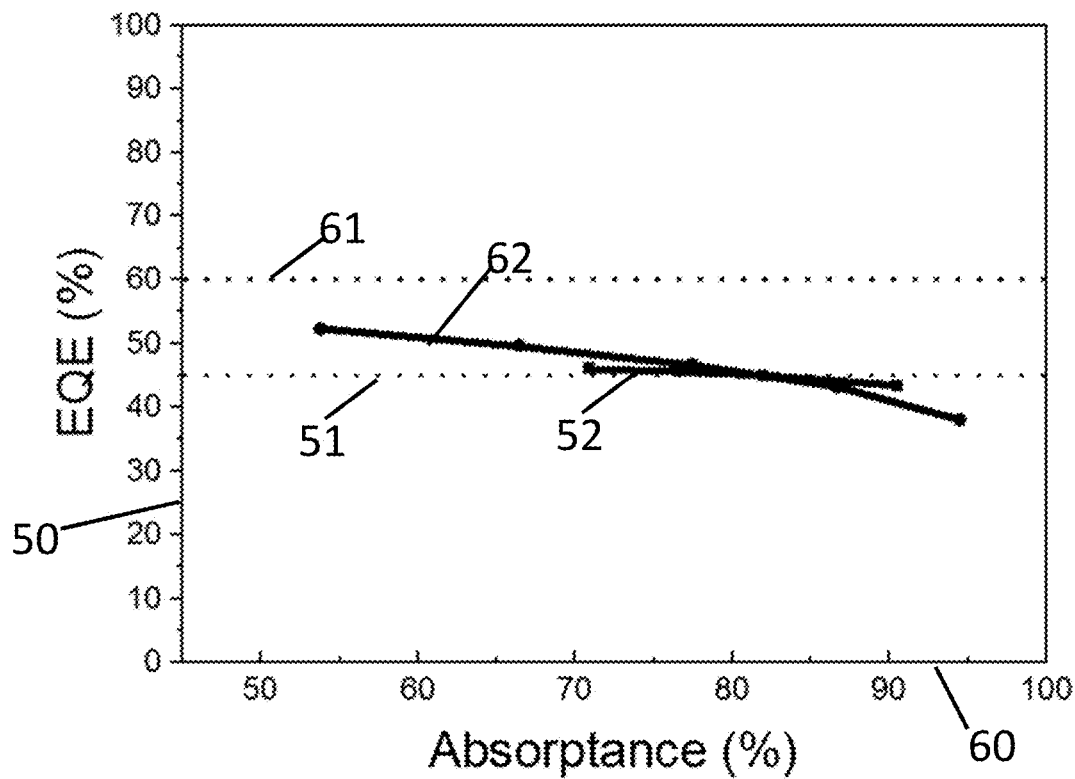
FIG. 5 is an experimental plot of the external quantum efficiency for InP/$Cd_{0.06}Zn_{0.94}Se$ quantum dots according to an embodiment of the disclosure, as function of the absorptance.

FIG. 5 is an experimental plot of the internal photoluminescence quantum yield (PLQY) 50 for InP/$Cd_{0.06}Zn_{0.94}Se$ quantum dots according to the disclosure, as function of the absorptance 60. FIG. 5 shows also corresponding curves for InP/ZnSe quantum dots. The material was excited with a blue LED. The dotted line 51 indicates an internal PLQY equal to 45% for InP/$Cd_{0.06}Zn_{0.94}Se$ quantum dots 1 in solution. The dotted line 61 indicates an internal PLQY equal to 60% for InP/ZnSe quantum dots 1 in solution. It will appear below that the InP/$Cd_{0.06}Zn_{0.94}Se$ quantum dots give rise to a lower self-absorption than the InP/ZnSe quantum dots which can compensate for the lower internal PLQY.

According to FIG. 5, admixing Cd results in a decrease in the PLQY. This decrease might be related to an enhanced delocalization of the electron wave function in the shell due to the addition of Cd. Possibly, this decrease can be avoided by further shell growth.

The full lines 52, 62 correspond to quantum dots embedded in a solid layer according to a method explained below in the present document. Experimentally, the concentration of quantum dots in the solid layer is varied in order to vary the absorptance. The external PLQY 52 for the InP/$Cd_{0.06}Zn_{0.94}Se$ quantum dots 1 embedded in the solid layer is very close to 45% and hardly changes with the absorptance, i.e., with the concentration in quantum dots 1. The external PLQY 62 for the InP/ZnSe quantum dots embedded in the solid layer is lower than in solution and decreases with the absorptance, i.e., with the concentration in quantum dots.

Figure 6:
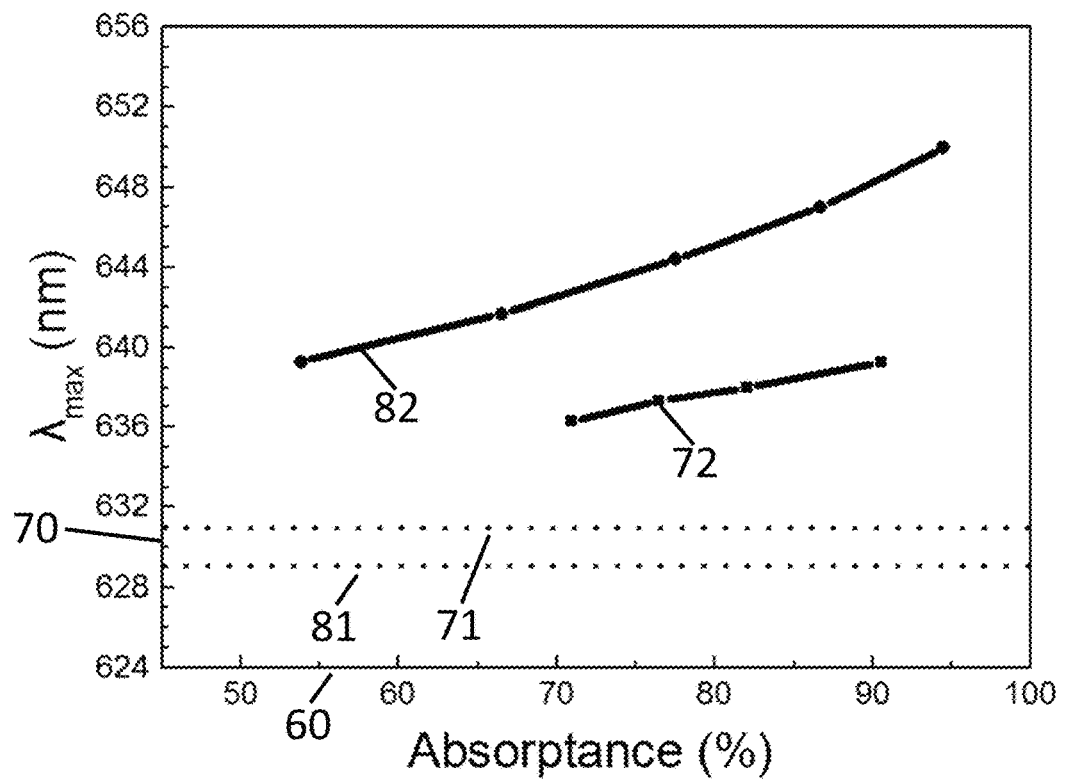
FIG. 6 is an experimental plot of the wavelength of maximum photoluminescence $\lambda_{max}$ for InP/$Cd_{0.06}Zn_{0.94}Se$ quantum dots according to an embodiment of the disclosure and for InP/ZnSe quantum dots, as function of the absorption.

FIG. 6 is an experimental plot of the wavelength of maximum photoluminescence $\lambda_{max}$ 70 for InP/$Cd_{0.06}Zn_{0.94}Se$ quantum dots according to the disclosure and for InP/ZnSe quantum dots, as function of the absorptance 60. The material was excited with a blue LED. The dotted line 71 indicates wavelength of maximum photoluminescence equal to 631 nm for InP/$Cd_{0.06}Zn_{0.94}Se$ quantum dots 1 in solution. The dotted line 81 indicates wavelength of maximum photoluminescence equal to 629 nm for InP/ZnSe quantum dots in solution.

The full line 72 corresponds to InP/$Cd_{0.06}Zn_{0.94}Se$ quantum dots 1 embedded in a solid layer according to the method explained below in the present document. The full line 82 corresponds to InP/ZnSe quantum dots embedded in a solid layer according to the same method. For InP/$Cd_{0.06}Zn_{0.94}Se$ and InP/ZnSe quantum dots, the wavelength of maximum photoluminescence is lower in solution than for quantum dots embedded in a solid layer. For InP/$Cd_{0.06}Zn_{0.94}Se$ and InP/ZnSe quantum dots embedded in a solid layer, the wavelength of maximum photoluminescence increases with the absorptance, i.e., with the concentration of quantum dots 1.

FIGS. 5 and 6 indicate that the quantum dots 1 according to the disclosure can keep their optical characteristics when embedded in a solid layer due to the reduction of self-absorption.

Figure 7:
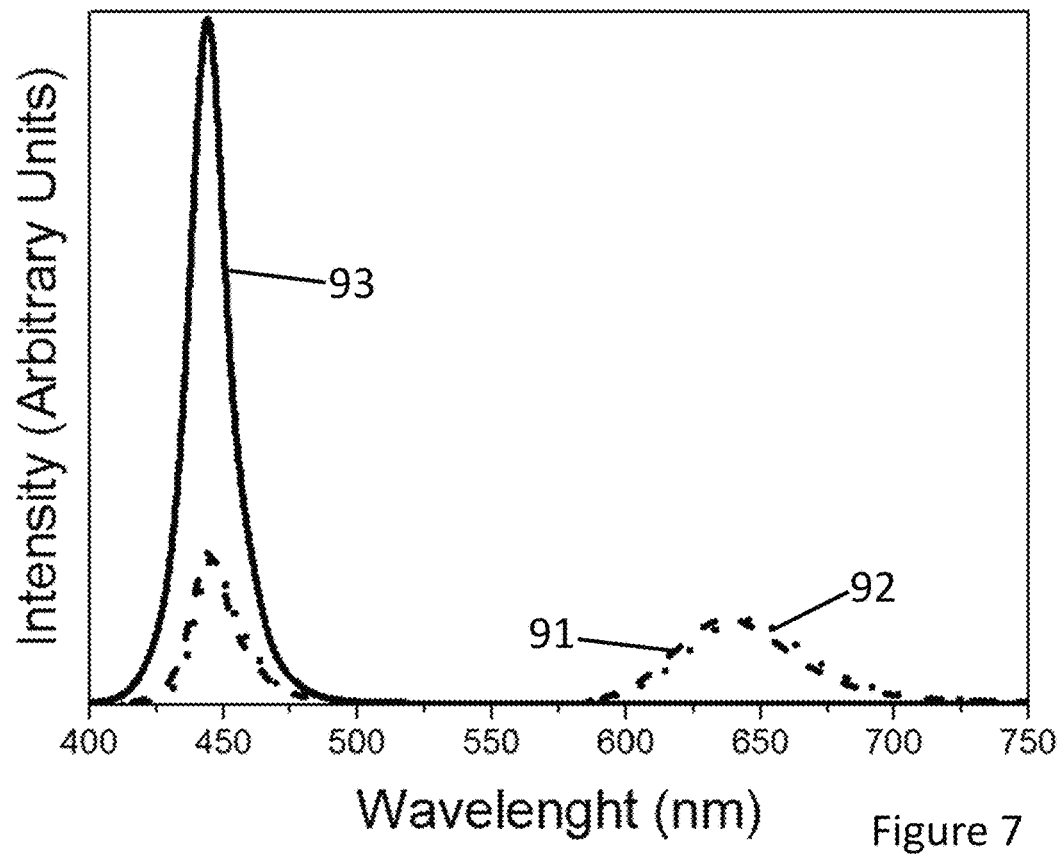
FIG. 7 is an experimental emission spectrum of a layer embedding InP/$Cd_{0.06}Zn_{0.94}Se$ quantum dots according to an embodiment of the disclosure and for a layer embedding InP/ZnSe quantum dots.

FIG. 7 is an experimental emission spectrum of a layer embedding 0.9 mg of InP/$Cd_{0.06}Zn_{0.94}Se$ quantum dots 91 and layer embedding 3.4 mg of InP/ZnSe quantum dots 92. It also shows the emission spectrum of the blue LED 93 that was used for the excitation of the layers. It appears that the InP/$Cd_{0.06}Zn_{0.94}Se$ quantum dots are able to provide a similar color conversion as InP/ZnSe quantum dots despite the original difference in PLQY −60% vs. 45%.

For InP/$Cd_{0.06}Zn_{0.94}Se$ quantum dots, the steadiness of the internal PLQY with the concentration (visible at FIG. 5) and the slight increase in the wavelength of maximum photoluminescence with the concentration (visible at FIG. 6) are typical fingerprints of a reduced self-absorption with respect to InP/ZnSe quantum dots, in line with the enhanced absorption at 450 nm due to Cd admixing. This reduced self-absorption may explain the similarity between the emission spectra for InP/$Cd_{0.06}Zn_{0.94}Se$ quantum dots 91 and InP/ZnSe quantum dots 92 (FIG. 7).

FIG. 7 also shows that about four times less InP/$Cd_{0.06}Zn_{0.94}Se$ quantum dots than InP/ZnSe quantum dots are needed to achieve the same downconversion at identical pump and emission wavelength. This is directly related to the absorption enhancement due to the alloyed shell.

The quantum dots 1 according to the disclosure are preferably at least partially covered by a ligand layer. In an embodiment of the disclosure the ligand layer is made of oleylamine compounds. In a further embodiment of the disclosure, the ligand layer comprises thiol compounds, for example dodecanethiol, propanethiol, butanethiol, pentanethiol, hexanethiol, heptanethiol, octanethiol, nonanethiol, decanethiol, etc. In another embodiment of the disclosure, the ligand layer comprises oleylamine compounds and thiol compounds.

Figure 8A:
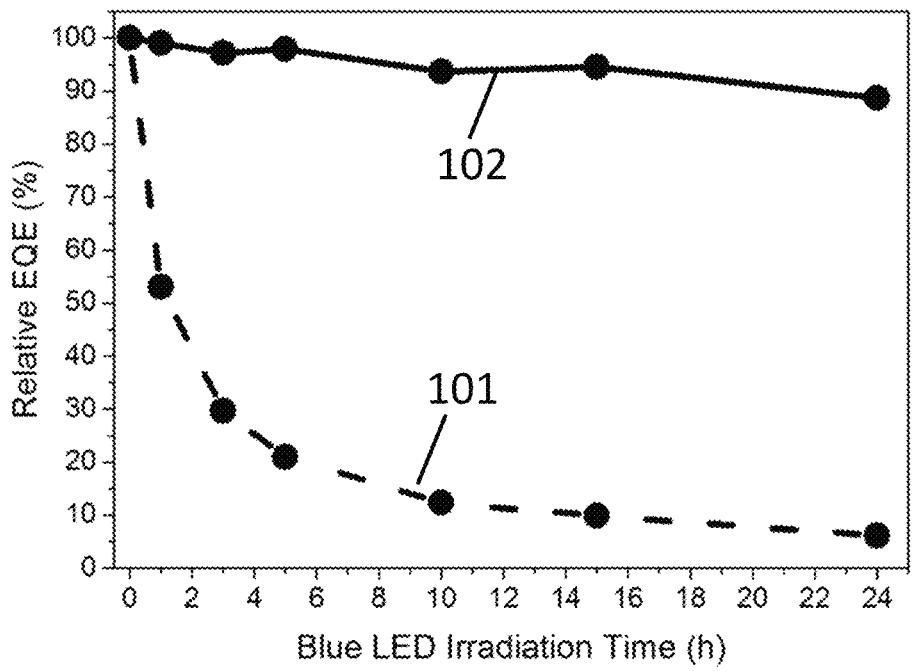
FIG. 8a is an experimental plot of the ratio between the actual external quantum efficiency and the external quantum efficiency at a starting time (t=0) as a function of the time, for InP/ZnSe quantum dots with a ligand layer of oleylamine and InP/ZnSe quantum dots with a ligand layer of dodecanethiol, under blue LED light irradiation.

FIG. 8a is an experimental plot of the ratio between the actual EQE and the EQE at t=0 as a function of the time, for InP/ZnSe quantum dots with a ligand layer of oleylamine 101 and InP/ZnSe quantum dots with a ligand layer of dodecanethiol 102, under blue LED light irradiation.

Figure 8B:
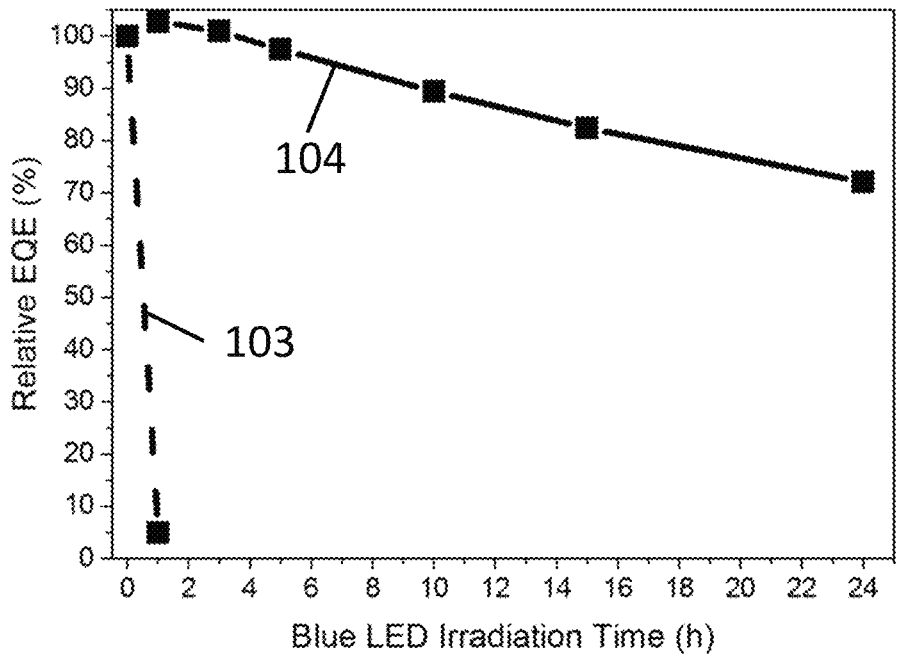
FIG. 8b is an experimental plot of the ratio between the actual external quantum efficiency and the external quantum efficiency at a starting time (t=0) as a function of the time, for InP/$Cd_{0.06}Zn_{0.94}Se$ quantum dots with a ligand layer of oleylamine and InP/$Cd_{0.06}Zn_{0.94}Se$ quantum dots with a ligand layer of dodecanethiol, under blue LED light irradiation.

FIG. 8b is an experimental plot of the ratio between the actual EQE and the EQE at t=0 as a function of the time, for InP/$Cd_{0.06}Zn_{0.94}Se$ quantum dots with a ligand layer of oleylamine 103 and InP/$Cd_{0.06}Zn_{0.94}Se$ quantum dots with a ligand layer of dodecanethiol 104, under blue LED light irradiation.

It appears from FIGS. 8a and 8b that the quantum dots with a ligand layer of dodecanethiol 102, 104 provides a much more stable PLQY than the quantum dots with a ligand layer of oleylamine 101, 103. In other words, the inventors have found that when thiol compounds are added in the quantum dots solutions, the quantum dots keep their EQE several months after storage and after a long time UV exposure.

Moreover, the inventors have shown that the improvement in stability due to thiol compounds exist when the quantum dots are embedded the solid layer according to a method explained below in the present document.

The quantum dot 1 according to the first embodiment of the disclosure can be produced with a process comprising the three following steps:
  (a) producing an InP core nanocrystal that will become the core 2 of the quantum dot 1, and
  (b) forming the shell 4 made of an alloy of Zn, Cd and Se on InP core nanocrystal.

The quantum dot 1 according to the second embodiment of the disclosure can be produced with a process comprising the three following steps:
  (a) producing an InP core nanocrystal that will become the core 2 of the quantum dot 1,
  (b) forming the first layer 3 of ZnSe on the InP core nanocrystal, and
  (c) forming the shell 4 made of an alloy of Zn, Cd and Se on the first layer 3.

Step (a) can be performed by any known method or by one of the exemplary methods disclosed in the present document.

Steps (a) and (b) can be performed by any know method that produces a quantum dot with a core of InP and a shell of ZnSe.

In an embodiment of the disclosure, step (a) comprises mixing a compound including Zn with a compound including In and a compound including P to generate a first mixture comprising InP core nanocrystals, and step (b) comprises mixing said first mixture with a compound including Se to generate a second mixture which is suitable for ZnSe growth on InP. Preferably, the first mixture comprises no cadmium. More preferably, the second mixture comprises no cadmium.

In an embodiment of the disclosure, step (c) comprises adding a compound including Cd, a compound including Zn and a compound including Se to the second mixture. Preferably, the compound including Cd and the compound including Zn are mixed together before being added to the second mixture to form a third mixture, and the compound including Se is added to the third mixture.

This process can for example be performed in the following way.

(a) 80 mg (0.225 mmol) of indium(III) bromide, as indium raw materials and 150 mg (1.1 mmol) of zinc(II) chloride, as zinc raw materials are mixed in 2.5 mL (7.6 mmol) of technical oleylamine (OLA) which is a coordinating solvent. The reaction mixture is stirred and degassed at 120° C. for an hour and then quickly heated to 180° C. under inert atmosphere. Upon reaching 180° C., a volume of 0.26 mL (0.95 mmol) of tris(diethylamino)phosphine (phosphorous:indium=4.2:1) are quickly injected in the above mixture. After the phosphorous precursor injection, the InP core nanocrystals synthesis proceeded.

(b) At 20 min, 0.45 mL of stoichiometric trioctylphosphine-Se (TOP-Se) at 2.24 M is injected.

(c) At 140 min, a mixture of 0.08 g (0.3 mmol) of Cd(acetate)$_2$ dihydrate and 1.71 g (2.71 mmol) of Zn(stearate)$_2$, (Cd to Cd+Zn fraction=7.3%) mixed with 8 mL of octadecene (ODE) and 2 mL of OLA is injected. Then temperature is increased from 180° C. to 320° C. and 1.4 mL of TOP-Se is injected drop by drop during the rise of temperature.

At 240 min the reaction is stopped and the temperature is cooled down.

The presence of the first layer 3 on the InP core nanocrystal is advantageous for the formation of the shell 4. Without the first layer 3 of ZnSe, the ZnCdSe shell 4 would have to grow on the InP core nanocrystal. The inventors have found that when the solution for ZnCdSe growth is in contact with the InP core nanocrystal, the formation of CdSe is more favorable than the formation of the ZnCdSe. They have overcome the problem by growing the first layer 3 of ZnSe on the InP core nanocrystal before the growth of the ZnCdSe external shell 4. However, there might be other solutions to this problem that bring quantum dots 1 with an InP core and a ZnCdSe external providing good optical properties for luminescent downconversion.

In every production processes described in the present document, the size of the quantum dots can be varied by changing the indium halide (Cl, Br, I) in step (a) as described in document WO2016146719 A1.

In every production processes described in the present document, degassing is optional.

In every production processes described in the present document, indium(III) bromide can be replaced by indium (III) chloride or indium(III) iodide.

In every production processes described in the present document, zinc(II) chloride can be replaced by zinc(II) bromide or zinc(II) iodide.

In every production processes described in the present document, different phosphorus precursors (amine)$_3$P type can be used: tris(dimethylamino)$_3$phosphine, tris(dipropylamino)$_3$phosphine, tris(diethylamino)$_3$phosphine, tris (dibutylamino)$_3$phosphine, tris(dioctylamino)$_3$phosphine, tris(butylamino)$_3$phosphine, tris(octylamino)$_3$phosphine, tris(dodecylamino)$_3$phosphine, tris(oleylamino)$_3$phosphine.

In every production processes described in the present document, cadmium acetate can be replaced by cadmium stearate, cadmium oleate, etc.

In every production processes described in the present document, zinc stearate can be replaced by zinc acetate, zinc oleate, etc.

In every production processes described in the present document, octadecene can be replaced by eicosane, docosane, etc.

The materials for the production process can for example be the following: indium(III) chloride (99.999%), indium (III) bromide (99.999%), (99.998%), zinc(II) chloride (≥98%), tris(diethylamino)phosphine (97%), selenium powder 100 mesh (99.99%), zinc stearate (technical grade, 65%) and cadmium acetate dihydrate (reagent grade, 98%), trioctylphosphine (>97%), oleylamine (80-90%) and octadecene (technical 90%).

An exemplary step (a), i.e. a synthesis of InP core nanocrystals that will become the cores 2 of the quantum dots 1, is the following. 50 mg (0.225 mmol) of indium(III) chloride, as indium raw materials, and 150 mg (1.1 mmol) of zinc(II) chloride, as zinc raw materials, are mixed in 2.5 mL (7.5 mmol) of technical oleylamine (OLA). The reaction mixture is stirred and degassed at 120° C. for an hour and then heated to 180° C. under inert atmosphere. Upon reaching 180° C., a volume of 0.23 mL (0.8 mmol) of tris (diethylamino)phosphine is quickly injected in the above mixture and InP core nanocrystals synthesis proceeded. The reaction occurs during 30 min. At the end of the reaction, the temperature is cooled down. InP core nanocrystals are then precipitated in ethanol and suspended in toluene. This synthesis provides InP core nanocrystals with a diameter of 3.2 nm (first excitonic absorption peak at 560 nm).

This synthesis can be modified to provide InP core nanocrystals with a diameter of 3.0 nm (first excitonic absorption peak at 540 nm) by replacing indium(III) chloride by indium(III) bromide.

A first exemplary process for steps (a) and (b), i.e. a synthesis of a structure made of a core 2 and a first layer 3, is the following. A 3.2 nm InP core nanocrystals production is performed at 180° C. Instead of cooling down the temperature, at 20 min 0.45 mL of sursaturated TOP-Se (2.24 M) is injected. At 140 min, a mixture 2 g (3 mmol) of Zn(stearate)$_2$, 8 mL of octadecene (ODE), 2 mL of OLA is injected. Then temperature is increased from 180° C. to 320° C. and 1.4 mL of TOP-Se is injected drop by drop during the rise of temperature. At 240 min the reaction is stopped and the temperature is cooled down. InP/ZnSe structures are then precipitated one time in ethanol and suspended in toluene. This structure, made of a core 2 and a first layer 3, has been found to emit at 629 nm.

A second exemplary process for steps (a) and (b), i.e. a synthesis of a structure made of a core 2 and a first layer 3, is the following. A 3.2 nm InP core nanocrystals production is performed at 180° C. Instead of cooling down the temperature, at 20 min 0.5 mL of sursaturated TOP-S (2.24 M) is injected. Then temperature is increased from 180° C. to 320° C. At 50 min the reaction is stopped and the temperature is cooled down. InP/ZnS structures are then precipitated one time in ethanol and suspended in toluene. This structure, made of a core 2 and a first layer 3, has been found to emit at 610 nm.

A first exemplary process for steps (a), (b) and (c) is the following. An 3.0 nm InP core nanocrystals production is performed at 180° C. Instead of cooling down the temperature, at 20 min, 0.45 mL of stoichiometric TOP-Se (2.24 M) is injected. At 140 min, a mixture of 0.08 g (0.3 mmol) of Cd(acetate)$_2$ dihydrate and 1.71 g (2.71 mmol) of Zn(stearate)$_2$, (Cd to Cd+Zn fraction=0.073) mixed with 8 mL of ODE and 2 mL of OLA is injected. Then temperature is increased from 180° C. to 320° C. and 1.4 mL of TOP-Se is injected drop by drop during the rise of temperature. At 240 min the reaction is stopped and the temperature is cooled down. InP/Cd$_{0.06}$Zn$_{0.94}$Se quantum dots 1 are then precipitated one time in ethanol and suspended in toluene. These quantum dots emit at 631 nm and have an atomic ratio Cd/(Cd+Zn) close to 6%.

A second exemplary process for steps (a), (b) and (c) is the following. An 3.2 nm InP core nanocrystals production is performed at 180° C. Instead of cooling down the temperature, at 20 min, 0.45 mL of stoichiometric TOP-Se (2.24 M) is injected. At 140 min, a mixture of 0.035 g (0.13 mmol) of Cd(acetate)$_2$ dihydrate and 1.794 g (2.84 mmol) of Zn(stearate)$_2$, (Cd to Cd+Zn fraction=0.032) mixed with 8 mL of ODE and 2 mL of OLA is injected. Then temperature is increased from 180° C. to 320° C. and 1.4 mL of TOP-Se is injected drop by drop during the rise of temperature. At 240 min the reaction is stopped and the temperature is cooled down. InP/Cd$_{0.025}$Zn$_{0.975}$Se quantum dots 1 are then precipitated one time in ethanol and suspended in toluene. These quantum dots emit at 634 nm and have an atomic ratio Cd/(Cd+Zn) close to 2.5%.

A third exemplary process for steps (a), (b) and (c) is the following. A 3.2 nm InP core nanocrystals production is performed at 180° C. Instead of cooling down the temperature, at 20 min, 0.45 mL of stoichiometric TOP-Se (2.24 M) is injected. At 140 min, a mixture of 0.069 g (0.26 mmol) of Cd(acetate)$_2$ dihydrate and 1.706 g (2.70 mmol) of Zn(stearate)$_2$, (Cd to Cd+Zn fraction=0.064) mixed with 8 mL of ODE and 2 mL of OLA is injected. Then temperature is increased from 180° C. to 320° C. and 1.4 mL of TOP-Se is injected drop by drop during the rise of temperature. At 240 min the reaction is stopped and the temperature is cooled down. InP/Cd$_{0.05}$Zn$_{0.95}$Se quantum dots 1 are then precipitated one time in ethanol and suspended in toluene. These quantum dots 1 emit at 644 nm and have an atomic ratio Cd/(Cd+Zn) close to 5%.

A fourth exemplary process for steps (a), (b) and (c) is the following. A 3.2 nm InP core nanocrystals production is performed at 180° C. Instead of cooling down the temperature, at 20 min, 0.45 mL of stoichiometric TOP-Se (2.24 M) is injected. At 140 min, a mixture of 0.15 g (0.56 mmol) of Cd(acetate)$_2$ dihydrate and 1.52 g (2.4 mmol) of Zn (stearate)$_2$, (Cd to Cd+Zn fraction=0.138) mixed with 8 mL of ODE and 2 mL of OLA is injected. Then temperature is increased from 180° C. to 320° C. and 1.4 mL of TOP-Se is injected drop by drop during the rise of temperature. At 240 min the reaction is stopped and the temperature is cooled down. InP/Cd$_{0.133}$Zn$_{0.867}$Se quantum dots 1 are then precipitated one time in ethanol and suspended in toluene. These quantum dots 1 emit at 664 nm and have an atomic ratio Cd/(Cd+Zn) close to 13.3%.

Quantum dots 1 produced by the above-mentioned processes have been characterized by EDX. The results of this characterization appear in the table below.

| Element | Atom % Quantum dots produced with the second exemplary process for steps (a), (b) and (c) | Atom % Quantum dots produced with the third exemplary process for steps (a), (b) and (c) | Atom % Quantum dots produced with the fourth exemplary process for steps (a), (b) and (c) |
| --- | --- | --- | --- |
| Zn (K) | 48 | 49 | 42 |
| Se (L) | 51 | 48 | 51 |
| Cd (L) | 1.2 | 2.6 | 6.5 |
| x | 0.025 | 0.05 | 0.133 |

The diameters of the InP/ZnSe structures and the quantum dots 1 produced by the above-mentioned processes have been characterized. The results of this characterization appear in the table below.

| Quantum dots | Mean Diameter (nm) | Standard Deviation (nm) | Minimum Diameter (nm) | Median Diameter (nm) | Maximum Diameter (nm) |
| --- | --- | --- | --- | --- | --- |
| InP/ZnSe | 10.2 | 0.88 | 8.2 | 10.3 | 12.1 |
| InP/Cd$_{0.025}$Zn$_{0.975}$Se | 14.8 | 1.3 | 11.7 | 15.2 | 17.2 |
| InP/Cd$_{0.05}$Zn$_{0.95}$Se | 14.2 | 1.6 | 10.4 | 14.0 | 17.9 |
| InP/Cd$_{0.133}$Zn$_{0.867}$Se | 14.4 | 1.2 | 11.9 | 14.3 | 18.8 |

Figure 9A:
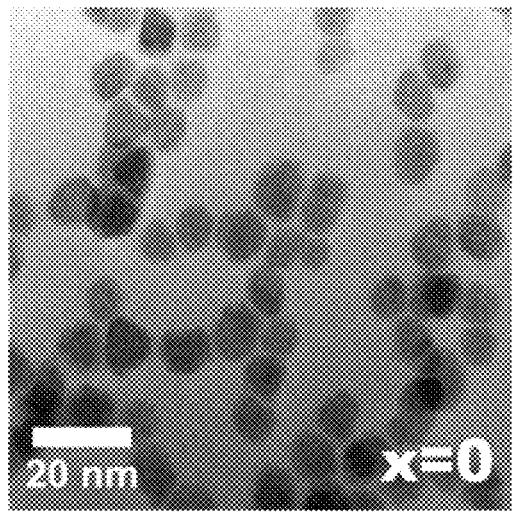
FIG. 9a is transmission electron microscope (TEM) picture of quantum dots without Cd.

FIG. 9a is transmission electron microscope (TEM) picture of quantum dots without Cd.

Figure 9B:
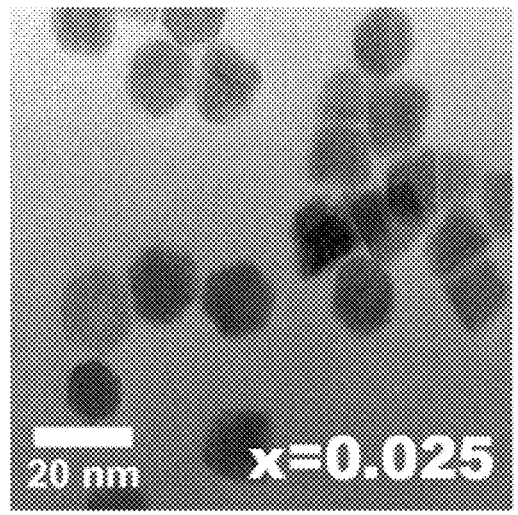
FIG. 9b is TEM picture of quantum dots according to an embodiment of the disclosure with an atomic ratio Cd/(Cd+Zn) close to 2.5%.

FIG. 9b is TEM picture of quantum dots 1 with an atomic ratio Cd/(Cd+Zn) close to 2.5%.

Figure 9C:
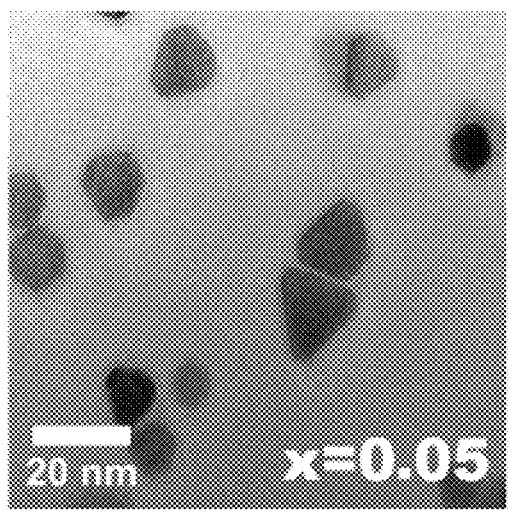
FIG. 9c is TEM picture of quantum dots according to an embodiment of the disclosure with an atomic ratio Cd/(Cd+Zn) close to 5%.

FIG. 9c is TEM picture of quantum dots 1 with an atomic ratio Cd/(Cd+Zn) close to 5%.

Figure 9D:
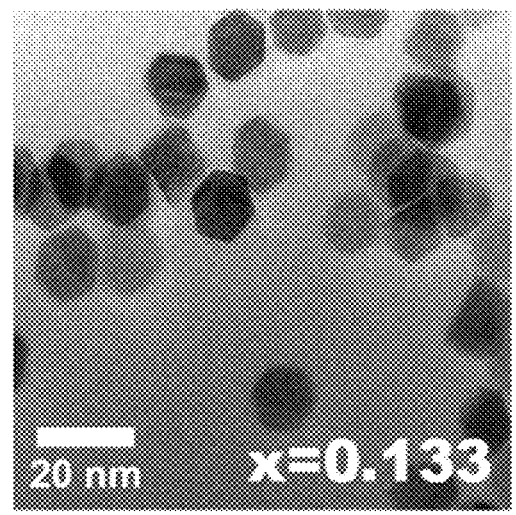
FIG. 9d is TEM picture of quantum dots according to an embodiment of the disclosure with an atomic ratio Cd/(Cd+Zn) close to 13.3%.

FIG. 9d is TEM picture of quantum dots 1 with an atomic ratio Cd/(Cd+Zn) close to 13.3%.

Figure 10:
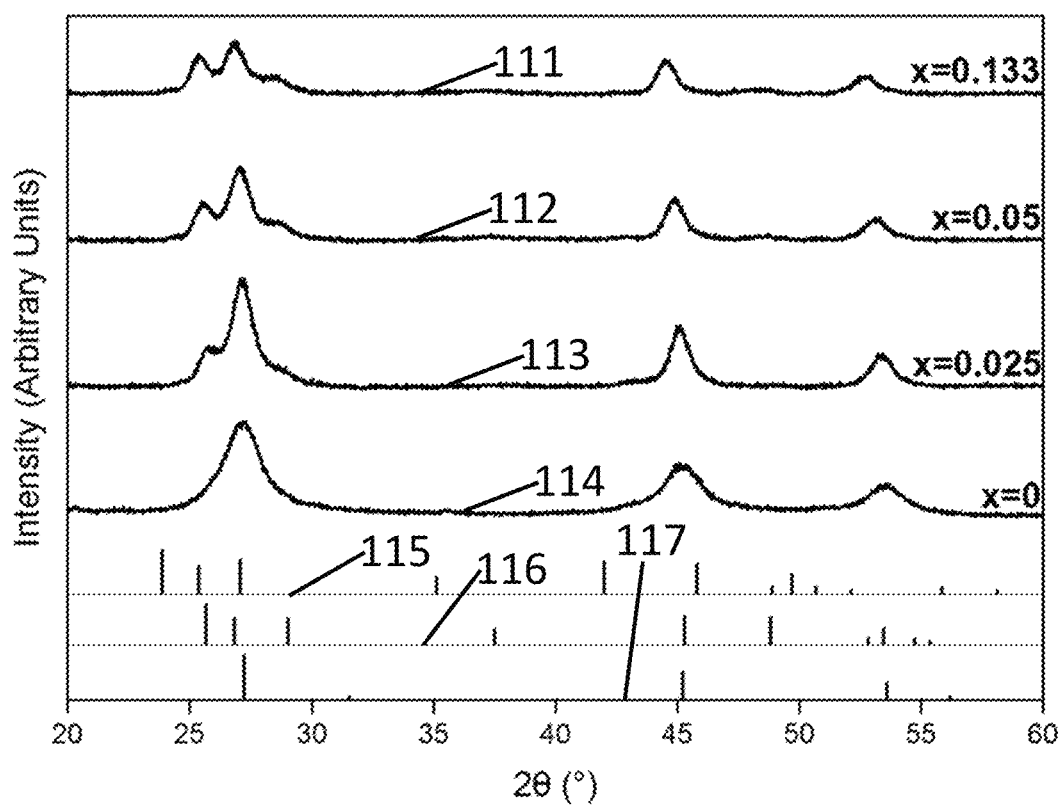
FIG. 10 is an experimental plot of XRD patterns of quantum dots.

FIG. 10 is an experimental plot of XRD (X-ray diffraction) patterns of quantum dots. Curve 111 corresponds to quantum dots 1 with an atomic ratio Cd/(Cd+Zn) close to 13.3%. Curve 112 corresponds to quantum dots 1 with an atomic ratio Cd/(Cd+Zn) close to 5%. Curve 113 corresponds to quantum dots 1 an atomic ratio Cd/(Cd+Zn) close to 2.5%. Curve 114 corresponds to quantum dots without Cd. The reference peaks on line 115 corresponds to CdSe wurtzite. The reference peaks on line 116 corresponds to ZnSe wurtzite. The reference peaks on line 117 corresponds to ZnSe cubic.

After step (c), a step (d) of adding a thiol compound can be performed. The thiol compound can be for example dodecanethiol, propanethiol, butanethiol, pentanethiol, hexanethiol, heptanethiol, octanethiol, nonanethiol, decanethiol, etc. According to an exemplary process, 2 mL of dodecanethiol (DDT) is added at 160° C. to the solution generated at step (c). This quenches the reaction mixture. The resulting quantum dots are precipitated three times in ethanol and suspended in toluene. Afterward, an extra amount of DDT is added.

An exemplary method to embed quantum dots 1 in a solid layer is the following. In the present example, the solid layer is a polymer film. Solid layers containing quantum dots 1 were prepared by mixing a solution containing quantum dots with 80 mg of Kraton FG1901X in 0.5 mL of toluene, stirring, and dropcasting on a circular glass substrate with a diameter of 18 mm. After evaporation of the solvents, transparent quantum dots remote phosphor layers are obtained. Such a solid layer can be used for example in a luminescent downconverter according to an embodiment of the disclosure.

The following method was used to characterize said layers. Layer efficiency measurements were performed inside an integrating sphere (152 mm, Spectralon coated). Excitation of the samples was done with a blue LED ($\lambda$max of 446.5 nm, FWHM of 19.2 nm and LER of 37 lm/W) and detection of outgoing light by a CCD camera (Princeton Instruments ProEM 16002), attached to a spectrograph (Princeton Instruments Acton SP2358). A baffle is mounted between the sample and the detection port of the integrating sphere. Internal and external quantum efficiency were determined by the two measurement approach. Quantum dots layers were analyzed by introducing the circular layer in a cylindrical, white teflon mixing chamber with a height of 20 mm, which contains the blue LED in the bottom center for excitation. The measurements were operated at a constant current of 20 mA, yielding a luminous efficacy of 7.26 lm/W, corresponding to a radiant efficiency RE of 29.3%.

FIG. 11 illustrate absorbance spectra for quantum dots according to the disclosure grown in the following way. 50 mg (0.225 mmol) of $InCl_3$, as indium raw materials, and 150 mg (1.1 mmol) of $ZnCl_2$, as zinc raw materials, are mixed in 2.5 mL (7.5 mmol) of technical oleylamine (OLA). The reaction mixture is stirred and degassed at 120° C. for an hour and then heated to 180° C. under inert atmosphere. Upon reaching 180° C., a volume of 0.23 mL (0.8 mmol) of tris(diethylamino)phosphine is quickly injected in the above mixture and InP nanocrystals synthesis proceeded. After 20 min, 0.45 mL of stoichiometric TOP-Se (2.24 M) is injected. At 140 min, a mixture of 0.035 g (0.13 mmol) of $Cd(acetate)_2$ dihydrate and 1.794 g (2.84 mmol) of $Zn(stearate)_2$, (Cd to Cd+Zn fraction=0.032) mixed with 8 mL of ODE and 2 mL of OLA is injected. Then temperature is increased from 180° C. to 320° C. and 1.4 mL of TOP-Se is injected drop by drop during the rise of temperature. At 240 min the reaction is stopped and the temperature is cooled down. $InP/Cd_{0.025}Zn_{0.975}Se$ quantum dots are then precipitated once in ethanol and suspended in toluene.

This protocol leads to the growth of an intermediate ZnSe shell after the core formation and before the shell growth stage.

Figure 11A:
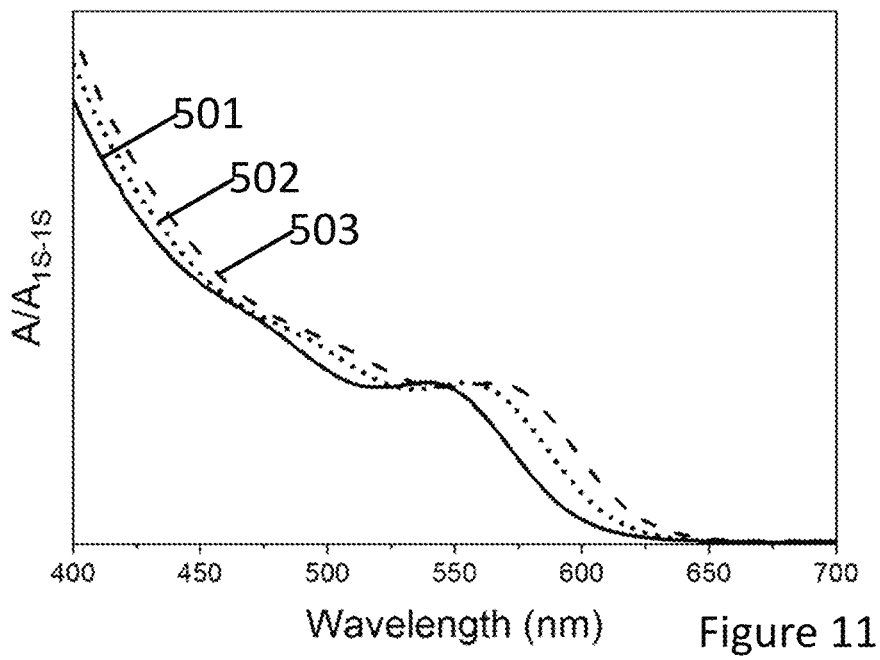
FIG. 11a illustrates absorbance spectra for quantum dots according to the disclosure grown during core formation.
Figure 11B:
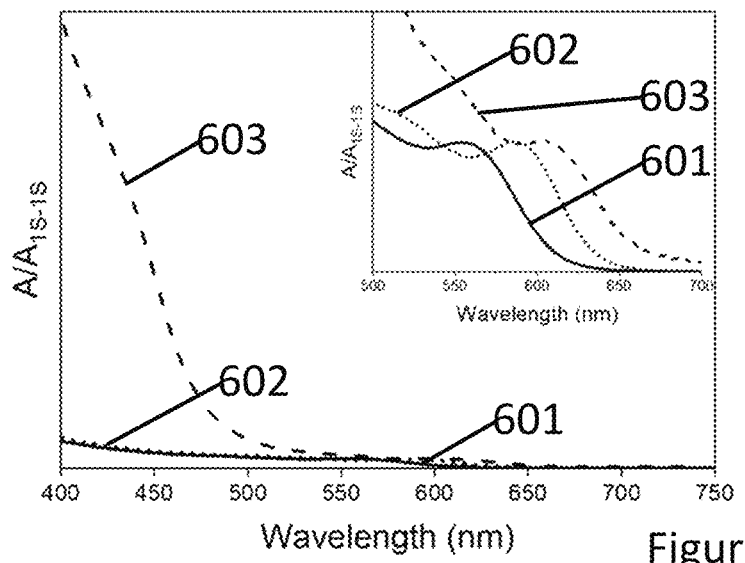
FIG. 11b illustrates absorbance spectra for quantum dots according to the disclosure grown during shell growth.

FIG. 11a corresponds to core formation. The spectrum has been normalized relative to the absorbance maximum $A_{1s-1s}$ of the band-edge feature. Curve 501 corresponds to 5 minutes, curve 502 corresponds to 10 minutes and curve 503 corresponds to 20 minutes. FIG. 11b corresponds to shell growth. The inset graph is a zoom on the band-edge transition. Curve 601 corresponds to 20 minutes (before ZnSe first layer), curve 602 corresponds to 73 minutes (after ZnSe first layer) and curve 603 corresponds to 330 minutes (after shell growth). The absorption spectra show a well-defined first excitonic transition during the synthesis.

FIG. 12 illustrate absorbance spectra for quantum dots including Cd in the first layer. The protocol is the same as for FIG. 11 except that the 150 mg (1.1 mmol) of $ZnCl_2$ are replaced by 22 mg (0.11 mmol) of $CdCl_2$ and 135 mg (0.99 mmol) of $ZnCl_2$. This protocol leads to the formation of an intermediate CdZnSe shell after the core formation and before the shell growth stage.

Figure 12A:
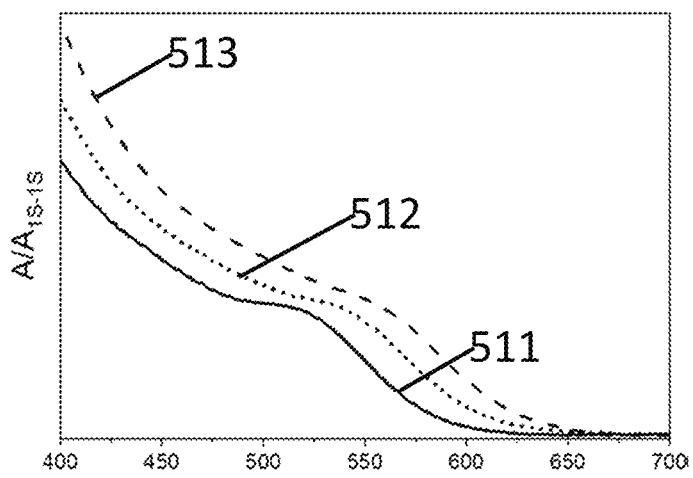
FIG. 12a illustrates absorbance spectra for quantum dots including Cd in the first layer during core formation.
Figure 12B:
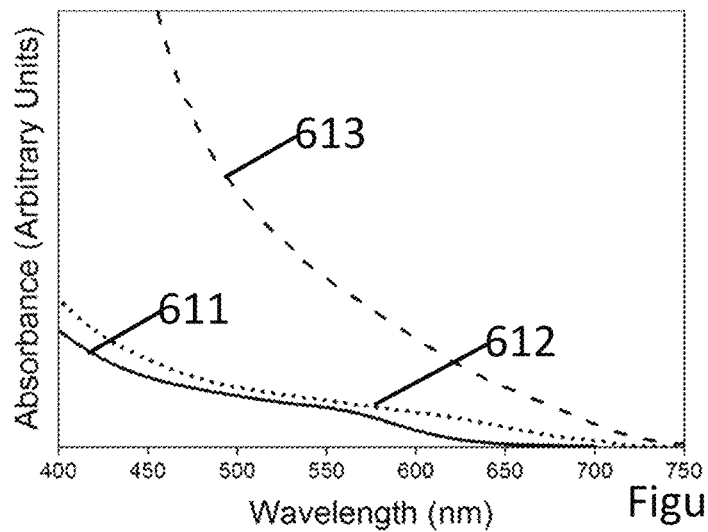
FIG. 12b illustrates absorbance spectra for quantum dots including Cd in the first layer during shell growth.

FIG. 12a corresponds to core formation. FIG. 12b corresponds to shell growth. The spectra have been normalized relative to the absorbance maximum $A_{1s-1s}$ of the band-edge feature. Curve 511 corresponds to 5 minutes, curve 512 corresponds to 10 minutes and curve 513 corresponds to 20 minutes. Curve 611 corresponds to 20 minutes (before CdZnSe first layer), curve 612 corresponds to 120 minutes (after CdZnSe first layer) and curve 613 corresponds to 316 minutes (after shell growth).

Comparing FIGS. 11 and 12, it appears that admixing $CdCl_2$ during the initial InP core synthesis induces an undesired redshift and a broadening of the first exciton transition. The broadening of the first exciton transition increases during shell growth stage and no apparent excitonic feature is present at the end of the synthesis.

Even if the above description has been made with respect to a core 2 made of InP, the quantum dots 1 according to the disclosure can be composed of any binary, ternary or quaternary III-V core comprising at least one group III element selected from: In, Ga, Al or a mixture thereof and comprising at least one group V element selected from: P, As or a mixture thereof.

Even if the above description has mainly been made with respect to a first layer 3 made of ZnSe, the quantum dots 1 according to the disclosure can have a first layer 3 of any binary or ternary II-VI material comprising one group II which is Zn and at least one group VI element selected from: S, Se or a mixture thereof.

Even if the above description has mainly been made with respect to an external shell 4 made of ZnCdSe, the quantum dots 1 according to the disclosure can have an external shell 4 of ternary or quaternary II-VI material comprising at least one group II element selected from Zn, Cd or a mixture thereof and at least one group VI element selected from S, Se or a mixture thereof.

For example, the quantum dots 1 can have:
- a core 2 of InP, a first layer 3 of ZnS, and an external shell 4 of ZnCdS,
- a core 2 of InP, a first layer 3 of ZnSe, and an external shell 4 of ZnCdS,
- a core 2 of InP, a first layer 3 of GaP, and an external shell 4 of ZnCdS,
- a core 2 of InP, a first layer 3 of AlP, and an external shell 4 of ZnCdS,
- a core 2 of InP, a first layer 3 of Zn(S,Se), and an external shell 4 of ZnCdS,
- a core 2 of InP, a first layer 3 of (Al,Ga)P, and an external shell 4 of ZnCdS,
- a core 2 of (In,Ga)P, a first layer 3 of ZnSe, and an external shell 4 of ZnCdS,
- a core 2 of (In,Ga)P, a first layer 3 of ZnS, and an external shell 4 of ZnCdS,
- a core 2 of (In,Ga)P, a first layer 3 of GaP, and an external shell 4 of ZnCdS, a core 2 of (In,Ga)P, a first layer 3 of AlP, and an external shell 4 of ZnCdS,
a core 2 of (In,Ga)P, a first layer 3 of Zn(S,Se), and an external shell 4 of ZnCdS,
a core 2 of (In,Ga)P, a first layer 3 of (Al,Ga)P, and an external shell 4 of ZnCdS,
a core 2 of (In,Al)P, a first layer 3 of ZnSe, and an external shell 4 of ZnCdS,
a core 2 of (In,Al)P, a first layer 3 of ZnS, and an external shell 4 of ZnCdS,
a core 2 of (In,Al)P, a first layer 3 of GaP, and an external shell 4 of ZnCdS,
a core 2 of (In,Al)P, a first layer 3 of AlP, and an external shell 4 of ZnCdS,
a core 2 of (In,Al)P, a first layer 3 of Zn(S,Se), and an external shell 4 of ZnCdS,
a core 2 of (In,Al)P, a first layer 3 of (Al,Ga)P, and an external shell 4 of ZnCdS,
a core 2 of In(As,P), a first layer 3 of ZnSe, and an external shell 4 of ZnCdS,
a core 2 of In(As,P), a first layer 3 of ZnS, and an external shell 4 of ZnCdS,
a core 2 of In(As,P), a first layer 3 of GaP, and an external shell 4 of ZnCdS,
a core 2 of In(As,P), a first layer 3 of AlP, and an external shell 4 of ZnCdS,
a core 2 of In(As,P), a first layer 3 of Zn(S,Se), and an external shell 4 of ZnCdS,
a core 2 of In(As,P), a first layer 3 of (Al,Ga)P, and an external shell 4 of ZnCdS,
a core 2 of GaAs, a first layer 3 of ZnSe, and an external shell 4 of ZnCdS,
a core 2 of GaAs, a first layer 3 of ZnS, and an external shell 4 of ZnCdS,
a core 2 of GaAs, a first layer 3 of GaP, and an external shell 4 of ZnCdS,
a core 2 of GaAs, a first layer 3 of AlP, and an external shell 4 of ZnCdS,
a core 2 of GaAs, a first layer 3 of Zn(Se,S), and an external shell 4 of ZnCdS,
a core 2 of GaAs, a first layer 3 of (Al,Ga)P, and an external shell 4 of ZnCdS,
a core 2 of InP, a first layer 3 of ZnS, and an external shell 4 of ZnCdSe,
a core 2 of InP, a first layer 3 of ZnSe, and an external shell 4 of ZnCdSe,
a core 2 of InP, a first layer 3 of GaP, and an external shell 4 of ZnCdSe,
a core 2 of InP, a first layer 3 of AlP, and an external shell 4 of ZnCdSe,
a core 2 of InP, a first layer 3 of Zn(S,Se), and an external shell 4 of ZnCdSe,
a core 2 of InP, a first layer 3 of (Al,Ga)P, and an external shell 4 of ZnCdSe,
a core 2 of (In,Ga)P, a first layer 3 of ZnSe, and an external shell 4 of ZnCdSe,
a core 2 of (In,Ga)P, a first layer 3 of ZnS, and an external shell 4 of ZnCdSe,
a core 2 of (In,Ga)P, a first layer 3 of GaP, and an external shell 4 of ZnCdSe,
a core 2 of (In,Ga)P, a first layer 3 of AlP, and an external shell 4 of ZnCdSe,
a core 2 of (In,Ga)P, a first layer 3 of Zn(S,Se), and an external shell 4 of ZnCdSe,
a core 2 of (In,Ga)P, a first layer 3 of (Al,Ga)P, and an external shell 4 of ZnCdSe,
a core 2 of (In,Al)P, a first layer 3 of ZnSe, and an external shell 4 of ZnCdSe,
a core 2 of (In,Al)P, a first layer 3 of ZnS, and an external shell 4 of ZnCdSe,
a core 2 of (In,Al)P, a first layer 3 of GaP, and an external shell 4 of ZnCdSe,
a core 2 of (In,Al)P, a first layer 3 of AlP, and an external shell 4 of ZnCdSe,
a core 2 of (In,Al)P, a first layer 3 of Zn(S,Se), and an external shell 4 of ZnCdSe,
a core 2 of (In,Al)P, a first layer 3 of (Al,Ga)P, and an external shell 4 of ZnCdSe,
a core 2 of In(As,P), a first layer 3 of ZnSe, and an external shell 4 of ZnCdSe,
a core 2 of In(As,P), a first layer 3 of ZnS, and an external shell 4 of ZnCdSe,
a core 2 of In(As,P), a first layer 3 of GaP, and an external shell 4 of ZnCdSe,
a core 2 of In(As,P), a first layer 3 of AlP, and an external shell 4 of ZnCdSe,
a core 2 of In(As,P), a first layer 3 of Zn(S,Se), and an external shell 4 of ZnCdSe,
a core 2 of In(As,P), a first layer 3 of (Al,Ga)P, and an external shell 4 of ZnCdSe,
a core 2 of GaAs, a first layer 3 of ZnSe, and an external shell 4 of ZnCdSe,
a core 2 of GaAs, a first layer 3 of ZnS, and an external shell 4 of ZnCdSe,
a core 2 of GaAs, a first layer 3 of GaP, and an external shell 4 of ZnCdSe,
a core 2 of GaAs, a first layer 3 of AlP, and an external shell 4 of ZnCdSe,
a core 2 of GaAs, a first layer 3 of Zn(Se,S), and an external shell 4 of ZnCdSe,
a core 2 of GaAs, a first layer 3 of (Al,Ga)P, and an external shell 4 of ZnCdSe,
a core 2 of InP, a first layer 3 of ZnS, and an external shell 4 of ZnCdSeSS,
a core 2 of InP, a first layer 3 of ZnSe, and an external shell 4 of ZnCdSeS,
a core 2 of InP, a first layer 3 of GaP, and an external shell 4 of ZnCdSeS,
a core 2 of InP, a first layer 3 of AlP, and an external shell 4 of ZnCdSeS,
a core 2 of InP, a first layer 3 of Zn(S,Se), and an external shell 4 of ZnCdSeS,
a core 2 of InP, a first layer 3 of (Al,Ga)P, and an external shell 4 of ZnCdSeS,
a core 2 of (In,Ga)P, a first layer 3 of ZnSe, and an external shell 4 of ZnCdSeS,
a core 2 of (In,Ga)P, a first layer 3 of ZnS, and an external shell 4 of ZnCdSeS,
a core 2 of (In,Ga)P, a first layer 3 of GaP, and an external shell 4 of ZnCdSeS,
a core 2 of (In,Ga)P, a first layer 3 of AlP, and an external shell 4 of ZnCdSeS,
a core 2 of (In,Ga)P, a first layer 3 of Zn(S,Se), and an external shell 4 of ZnCdSeS,
a core 2 of (In,Ga)P, a first layer 3 of (Al,Ga)P, and an external shell 4 of ZnCdSeS,
a core 2 of (In,Al)P, a first layer 3 of ZnSe, and an external shell 4 of ZnCdSeS,
a core 2 of (In,Al)P, a first layer 3 of ZnS, and an external shell 4 of ZnCdSeS,
a core 2 of (In,Al)P, a first layer 3 of GaP, and an external shell 4 of ZnCdSeS, a core 2 of (In,Al)P, a first layer 3 of AlP, and an external shell 4 of ZnCdSeS,
a core 2 of (In,Al)P, a first layer 3 of Zn(S,Se), and an external shell 4 of ZnCdSeS,
a core 2 of (In,Al)P, a first layer 3 of (Al,Ga)P, and an external shell 4 of ZnCdSeS,
a core 2 of In(As,P), a first layer 3 of ZnSe, and an external shell 4 of ZnCdSeS,
a core 2 of In(As,P), a first layer 3 of ZnS, and an external shell 4 of ZnCdSeS,
a core 2 of In(As,P), a first layer 3 of GaP, and an external shell 4 of ZnCdSeS,
a core 2 of In(As,P), a first layer 3 of AlP, and an external shell 4 of ZnCdSeS,
a core 2 of In(As,P), a first layer 3 of Zn(S,Se), and an external shell 4 of ZnCdSeS,
a core 2 of In(As,P), a first layer 3 of (Al,Ga)P, and an external shell 4 of ZnCdSeS,
a core 2 of GaAs, a first layer 3 of ZnSe, and an external shell 4 of ZnCdSeS,
a core 2 of GaAs, a first layer 3 of ZnS, and an external shell 4 of ZnCdSeS,
a core 2 of GaAs, a first layer 3 of GaP, and an external shell 4 of ZnCdSeS,
a core 2 of GaAs, a first layer 3 of AlP, and an external shell 4 of ZnCdSeS,
a core 2 of GaAs, a first layer 3 of Zn(Se,S), and an external shell 4 of ZnCdSeS, or a core 2 of GaAs, a first layer 3 of (Al,Ga)P, and an external shell 4 of ZnCdSeS.

Although the present disclosure has been described above with respect to particular embodiments, it will readily be appreciated that other embodiments are also possible.

The invention claimed is:

1. Quantum dot comprising:
   a core of InP;
   a first layer of ZnSe; and
   an external shell of a ternary or quaternary II-VI material consisting in:
   Zn,
   Cd, and
   at least one element selected from the group consisting of S and Se,
   wherein the ratio between the number of atoms of Cd and the sum of the number of atoms of Zn and the number of atoms of Cd is between 0.02 and 0.2.

2. The quantum dot of claim 1, wherein the ratio between the number of atoms of Cd and the sum of the number of atoms of Zn and the number of atoms of Cd is between 0.025 and 0.133.

3. The quantum dot of claim 1, wherein the proportion between Zn and Cd in the external shell is such that a conduction band of the external shell is at a higher energy than the conduction band of the core.

4. The quantum dot of claim 1, wherein the external shell is made of an alloy of Zn, Cd and Se.

5. The quantum dot of claim 1, wherein the first layer has a thickness up to 0.8 nm.

6. The quantum dot of claim 5, wherein the first layer has a thickness of between 0.2 and 0.8 nm.

7. The quantum dot of claim 1, further comprising a ligand layer comprising thiol molecules.

8. A polymer film comprising the quantum dot according to claim 1.

9. A luminescent downconverter for converting down light frequency and comprising the quantum dot according to claim 1.

10. A process for producing a quantum dot comprising the steps of:
    (a) producing a core nanocrystal of a binary, ternary or quaternary III-V material consisting in:
       at least one element selected from the group consisting of In, Ga and Al, and
       at least one element selected from the group consisting of P and As;
    (b) forming a first layer on the core nanocrystal, the first layer being of a binary or ternary II-VI material consisting in:
       Zn, and
       at least one element selected from the group consisting of S and Se;
    (c) forming an external shell on the first layer, the external shell being of a ternary or quaternary II-VI material consisting in:
       Zn
       Cd, and
       at least one element selected from the group consisting of S and Se; and
    wherein the external shell is made of an alloy of Zn, Cd and Se and step (c) comprises adding a compound including Cd, a compound including Zn and a compound including Se to a solution produced at step (b); and
    wherein step (c) comprises, in this order:
       adding a compound including Cd and a compound including Zn to a solution produced at step (b), and
       adding a compound including Se, and
       wherein the atomic ratio between the added Cd and the added Cd plus the added Zn is between 0.02 and 0.2.

11. The process of claim 10, wherein step (a) is producing an InP core nanocrystal and step (b) is forming a first layer of ZnSe or ZnS around the InP core nanocrystal.

12. The process of claim 11, wherein step (a) comprises mixing a compound including Zn with a compound including In and a compound including P to generate a first mixture and step (b) comprises mixing the first mixture with a compound including Se or S to generate a second mixture.

13. The process of claim 10, further comprising a step (d) of adding a thiol compound to a solution resulting from step (c).

* * * * *